United States Patent [19]
Danré

[11] Patent Number: 4,458,716
[45] Date of Patent: Jul. 10, 1984

[54] DEVICE FOR PILOTING A SAFETY VALVE

[75] Inventor: Jean Danré, La Varenne St Hilaire, France

[73] Assignee: A.B.D. S.A.R.L., Orleans, France

[21] Appl. No.: 397,858

[22] Filed: Jul. 13, 1982

[30] Foreign Application Priority Data

Jul. 17, 1981 [FR] France ................. 81 13970

[51] Int. Cl.³ ............................................. F16K 31/12
[52] U.S. Cl. .................................. 137/488; 137/492.5
[58] Field of Search ............ 137/488, 489, 492, 492.5; 251/29

[56] References Cited

U.S. PATENT DOCUMENTS 3,754,566  8/1973  Gemigniani ................. 137/488
4,390,041  6/1983  Reip ............................. 137/488

Primary Examiner—Alan Cohan
Attorney, Agent, or Firm—Wenderoth, Lind & Ponack

[57] ABSTRACT

This device comprises a directional stage including a slide (30,32) of a directional valve, which slide carries a drain valve (34) and a valve of communication (36) with a vessel to be protected.

The slide is controlled by the pressure in an intermediate cavity (42). A piloting stage comprises communication valves (48,50) for putting the cavity (42) of the directional valve in communication with the vessel and the drain (24) respectively under the differential action of an adjustable and calibrated system and of the pressure in the vessel. The system comprises a plurality of independently adjustable elements (62,70,72) which in particular modify the travels of the communication and drain valves (48 and 50).

10 Claims, 4 Drawing Figures

U.S. Patent   Jul. 10, 1984   4,458,716
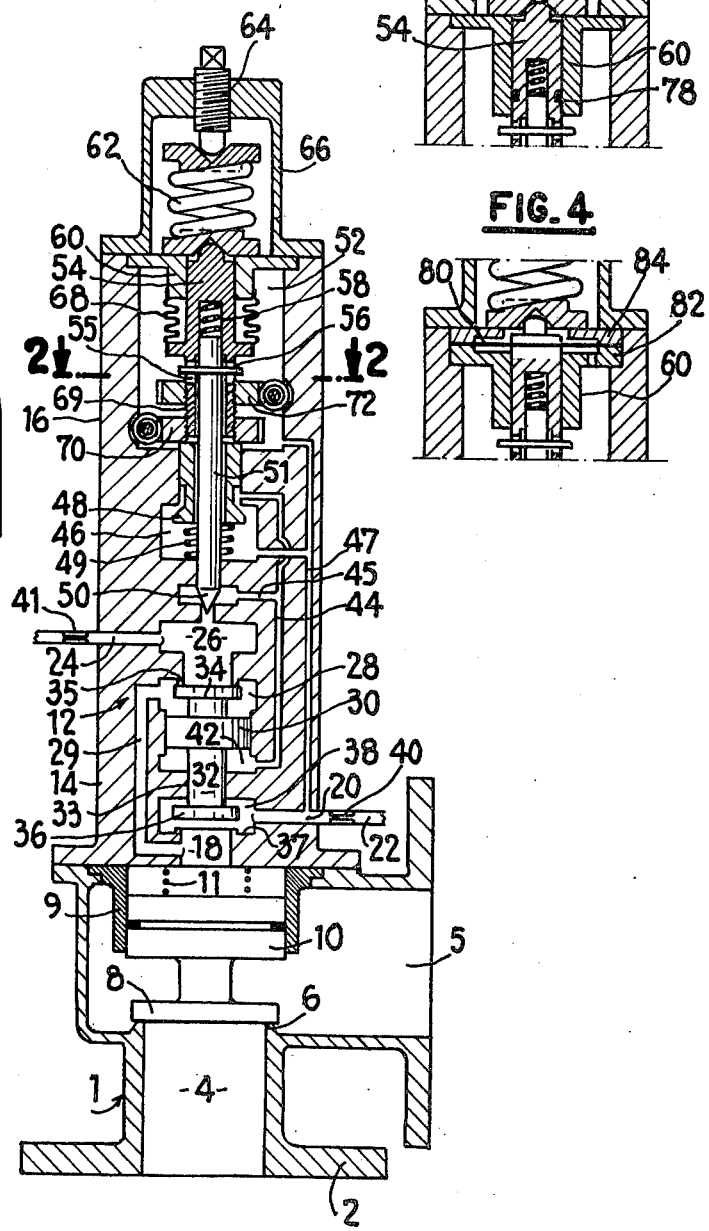
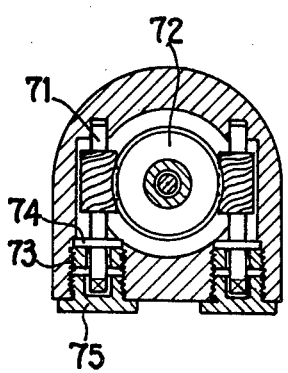

DEVICE FOR PILOTING A SAFETY VALVE

DESCRIPTION

Safety valves for limiting the pressure of a fluid inside a vessel must not only permit the automatic discharge of a certain volume of this fluid when the pressure exceeds a given value and close when this pressure is brought back to normal service conditions but also ensure a sealed closure of the vessel under these normal service conditions, with limited differences between the opening pressure and the closing pressure. Now, it is well known that such a seal is not achieved when the pressure of the fluid in the vessel is in the neighborhood of the given opening pressure.

Safety valves are sometimes controlled by a piloting device which senses the pressure of the fluid in the vessel for the purpose of actuating the valve as a function of this pressure and has for purpose to achieve instantaneous and definite openings and closures with small differences between the valve opening pressure and the valve closing pressure.

These piloting devices usually comprise a piston which is rendered rigid with the closure member of the safety valve and moves in a cylinder which is put in communication with the vessel to be protected and with a drain device. Closure devices controlled by the pressure of the fluid in the vessel indeed put the cylinder in communication with this vessel under normal service conditions then with a drain pipe when the pressure exceeds the predetermined value which causes the opening of the closure member of the safety valve and allows the fluid to escape under pressure by way of an outlet orifice. Inversely, these closure devices close the communication of the cylinder with the drain pipe and re-open the communication with the vessel when the pressure drops to a value lower than the given pressure.

Different types of piloting devices have already been constructed. Some comprise one or more safety valves of small size, but the drawbacks inherent in the conventional safety valve are again found in the valves of the piloting device. The problem is less serious but remains to be solved.

Other piloting devices have been designed and developed for a given application, but cannot be adapted to both low-pressure vessels and high-pressure vessels.

Therefore, the object of the present invention is to provide a piloting device which ensures an instantaneous and definite opening and closing of the safety valve in a reliable manner irrespective of the pressure in the vessel to be protected.

The invention provides a device comprising a piston rigid with the closure member of the valve and movable in cylinder which is in communication through valves with the vessel to be protected and with a drain orifice, said device comprising a sliding directional valve whose slide carries, on one hand, at its ends the valves for closing the communication of the cylinder with the vessel and with the drain orifice and, on the other hand, in its median part, a piston having one face subjected to the pressure prevailing in the cylinder and another face which defines an intermediate cavity of the directional valve; and a pilot which comprises a valve for closing a pipe for putting the vessel in communication with the cavity of the directional valve which is maintained normally open by an adjustable and calibrated system which opposes the pressure in the vessel but which is returned to its closing position as soon as it is released from said system; and a drain valve which isolates the cavity of the directional valve from the drain orifice and is carried with a slight axial clearance by the adjustable and calibrated system and is opened by said system after the closure of the valve putting the vessel and the cavity in communication.

This piloting device thus comprises two stages which respectively ensure the directional function for the controlling fluid in the cylinder and the piloting or controlling fluid for the displacement of the directional valve. Consequently, the piloting elements may be adjusted with all the desired precision without affecting the function of the directional valve, i.e. the rapidity of the safety valve opening and closing operations. Further, the sections of passage of the fluid in the directional valve may be determined as a function of the volume displaced in the course of the opening and closing operations without adversely affecting the operational precision of the piloting.

Moreover, as the volume displaced in the cylinder by the piston is several hundred times larger than that displaced in the directional valve, it is possible to use in the pilot only passages of small section which may be adjusted with high precision.

The pilot may thus be adapted to both high-pressure fluids and low-pressure fluids and may permit achieving a difference which is as small as possible between the opening pressure and the closing pressure irrespective of the magnitude of this pressure.

The following description of embodiments, given solely by way of examples and shown in the accompanying drawings, will bring out the advantages and features of the invention.

In the drawings:

FIG. 1 is a diagrammatic longitudinal sectional view of a safety valve associated with a piloting device according to the invention;

FIG. 2 is a sectional view taken along line 2-2 of FIG. 1, and

FIGS. 3 and 4 are partial views of modifications of the end of the pilot and in particular of the sealing device between the chamber at the pressure of the vessel and the exterior.

The illustrated safety valve comprises a body 1 adapted to be secured, for example by means of a flange 2, to the vessel to be protected. The body 1 defines a first conduit 4 of communication with the vessel and a second conduit 5 which is connected to a discharge pipe. The junction between the conduits 4 and 5 forms a seat 6 adapted to cooperate with a closure member 8 of the valve. The body 1 also carries a cylinder 9 in which is movable a piston 10 rigid with the closure member 8. A spring 11 closes the closure member 8 when the operating pressure is nil.

The displacement of the piston 10 controlling the opening and closing movements of the closure member 8 is under the control of a piloting device which comprises, within a body 12 secured to the body 1 of the safety valve, a directional valve 14 and a pilot 16.

The directional valve 14 comprises at one end an orifice 18 of communication with the interior of the cylinder 9 and an orifice 20 connected through a pipe 22 to the vessel to be protected. At its opposite end, it is provided with a drain orifice 24. The directional valve further comprises a stepped axial bore extending between the orifice 18 and a drain chamber 26 onto which the orifice 24 opens. Apart from this drain chamber 26, the bore forms a large-diameter chamber 28 having one end in communication with the orifice 18 by way of a conduit 29. A slide of the directional valve is formed by a stepped pistion which has a portion 30 slidable in the large-diameter bore 28 and a portion 32 of smaller diameter which is guided in a portion 33 of the directional valve bore of corresponding diameter. At each of its ends, i.e. on each side of the large-diameter piston 30, the slide carries a valve 34 and 36 respectively. The valve 34 cooperates with the seat 35 formed at the junction between the drain chamber 26 and the large-diameter bore 28. The second valve 36 is adapted to cooperate with a seat 37 formed at the end of the orifice 18 in a chamber 38 communicating with the fluid inlet orifice 20.

Under normal service conditions, the slide of the directional valve is in the position shown in FIG. 1 in which the valve 34 isolates the drain orifice 24 while the valve 36 is open and allows the fluid arriving by way of the pipe 20 to enter the cylinder 9 and reach the upper part of the bore 28 by way of the conduit 29. The piston 10 is then subjected to the pressure which prevails in the vessel to be protected and, as its effective area is distinctly larger than that of the closure member 8, the latter is maintained closed.

It is clear that a displacement of the slide toward the orifice 18 applies the valve 36 against the seat 37 while it opens the valve 34. The cylinder 9 is then isolated from the inlet pipe 20 and put into communication by way of the conduit 29 with the drain orifice 24 which allows the fluid contained in the directional valve to escape by way of this orifice 24 and thereby cause the piston 10 to rise under the action of the pressure exerted under the closure member 8.

Jets 40 and 41 respectively mounted in the inlet pipe 20 and in the drain orifice 24 enable the flow of fluid, and consequently the rapidity of the operations for respectively closing and opening the valve, to be adjusted.

Irrespective of the position of the slide of the directional valve, the face of the piston 30 which is close to the valve 34 is in communication with the orifice 18 and the cylinder 9 by way of the conduit 29. The opposite face of this piston 30 defines with the second portion of the bore 28 and the piston 32 a cavity 42 which is in communication with a chamber 46 of the pilot 16 by way of a conduit 44. The chamber 46 is also connected through a conduit 47 with the inlet pipe 20 of the directional valve, i.e. with the vessel to be protected. Inside the chamber 46, a valve 48 for putting in communication is biased by a spring 49 toward the end of the conduit 44 which it tends to isolate from the conduit 47.

The cavity 42 is also connected, through the conduit 44, a second conduit 45 and a drain valve 50, to the drain chamber 26 and to the orifice 24.

The chamber 46 is in constant communication with a chamber 52 of which it may be considered to be a part and which is always maintained at the pressure in the vessel to be protected through the conduit 47. The drain valve 50, which is of the needle valve type, is extended by a rod 51 which axially extends through the communication valve 48 and extends inside the chamber 52 in a hollow piston 54. A transverse branch 56, diametrically fixed in the rod 51 and extending through two oval apertures 55 in the wall of the piston 54, connects these two elements and enables them to undergo a limited axial relative displacement. However, a spring 58 is inserted between the rod 51 and the inner end of the hollow piston 54 and biases the valve 50 towards its seat.

The piston 54 is guided in a cylindrical end member 60 which is secured to the end of the body 12 of the piloting device. In this way, it projects out of the body 12 and is subjected to the force of a spring 62 whose resistance may be adjusted by means of a screw 64 screwed in a cap 66 secured to the body 12. A bellows 68, mounted between the end member 60 and a flange of the piston 54, seals the junction between these two elements and hermetically closes the chamber 52. At the end opposed to the end member 60, the piston 54 has a screwthread 69 on which two helical wheels, namely 70 and 72, are screwed. The end helical wheel 70 under the normal service conditions comes into contact with the rod of the communication valve 48 and exerts on this rod an action which opposes that of the spring 49 and maintains the valve open, as shown in FIG. 1. Preferably, a micrometer screw 71 is engaged with the wheel 70 (FIG. 2) and is extended by a square rod which permits the actuation and the adjustment of the position of the wheel 70 on the screwthread 69.

The micrometer screw 71 is disposed in a cavity of the body 12 of the piloting device, it being for example maintained in position by abutments 73 which cooperate with the flange 74, and a plug 75 closes the cavity during the use of the device. The position of the helical wheel 70 on the screwthread 60 determines the travel of the valve 48 between its opening position and its closing position and compresses the spring 49 to a greater or lesser extent.

In the same way, the helical wheel 72 is engaged with a micrometer screw which permits the adjustment of its axial position along the screwthread 69, i.e. its position relative to the aperture 55 and the pin 56. Consequently, the position of this wheel 72 determines the magnitude of the axial clearance between the piston 54 and the rod 51 of the drain valve.

Under normal operating conditions, when the valve 34 of the directional valve is closed, the communication valve 48 is open while the drain valve 58 is closed. Consequently, the cavity 42 of the directional valve is subjected to the pressure in the vessel, the conduits 44 and 47 being in communication in the chamber 46. When the pressure in the vessel to be protected increases, the pressure in the chamber 52 increases in the same way and, when this pressure exceeds the pressure of adjustment of the spring 62, the piston 54 is raised against the action of this spring and drives the helical wheel 70 against which the rod of the valve 48 bears, this rod being biased by the spring 49. Thus this valve moves toward the closing position. The cavity 42 is then isolated from the vessel to be protected.

During this displacement, the needle valve 50 has been maintained against its seat by the spring 58 owing to the axial clearance it has relative to the piston 54. However, when the wheel 72, in continuing its travel, comes into contact with the pin 56, the drain valve opens and the cavity 42 is put in communication with the drain orifice 24.

At this moment, the inner face of the piston 30 of the slide of the directional valve, i.e. the face which defines the cavity 42, is at atmospheric pressure while its opposite face remains subjected to the pressure prevailing in the cylinder 9 and in the vessel to be protected. The slide of the directional valve therefore moves in the direction of the orifice 18 which is closed by the valve 36 while the valve 34 puts the cylinder 9 in communication with the drain orifice 24. The fluid escapes by way of this orifice and the piston 10 moves and opens the closure member 8.

Inversely, when the pressure in the vessel to be protected, and consequently the pressure in the chamber 52, decreases and reaches a value lower than the predetermined adjusted pressure, the spring 62 biases the piston 54 toward the valve 48 and drives the wheels 72 and 70 and the pin 56 maintained against the wheel 72 by the spring 58. The valve 50 then returns to the closed position. The wheel 70 reaches a position of abutment against the rod of the valve 48 which it urges toward its opening position by compressing the spring 49. The cavity 42 is then again in communication with the vessel to be protected and the opposite face is again in communication with the atmosphere. Under the effect of this differential pressure, the slide of the directional valve is again moved and resumes the position shown in FIG. 1 in which it closes the drain orifice and puts the cylinder 9 in communication with the inlet orifice 20. The increase in pressure in the cylinder 9 then causes the instantaneous displacement of the piston 10 and the shifting of the closure member 8 to the closing position.

It will be observed that the opening pressure and the closing pressure are determined not only by the adjusting spring 62 but also by the position of the helical wheels 70 and 72. Consequently, for a given force of compression of the adjusting spring 62 and for a given difference between the opening pressure and the closing pressure of the safety valve, it is possible to vary the opening pressure with precision. Likewise, for a given force of compression of the adjusting spring 62 and for a given opening pressure, the difference between this opening pressure and the closing pressure of the safety valve can be varied with precision.

Furthermore, the volume displaced by the piston of the valve is several hundred times larger than that displaced in the directional valve, which facilitates the precision of the adjustment and permits the use in the pilot of passages of very small section which allow a fine and precise adjustment, irrespective of the magnitude of the pressure of the fluid.

It is clear that the sections of the passages for the fluid in the directional valve have no effect on the operation of the piloting device and may consequently be chosen as a function of the volume and of the pressure of the fluid to be displaced in the course of the operation. The rapidity of the opening and closing of the safety valve may thus be determined as a function of the flow of fluid.

Of course, the sealing bellows shown in FIG. 1 may be replaced by any other suitable device. For example, as shown in FIG. 3, the piston 54 may be provided with an O-section ring 78 which slides therewith along the cylindrical wall of the end member 60.

According to another modification, the bellows 68 is replaced by a flexible membrane 18 of elastomer or metal which is clamped adjacent its periphery between an annular flange 82 of the end member 60 and a ring 84 fixed on the body 12 of the piloting device (FIG. 4).

Likewise, while in the illustrated embodiment the body 12 of the piloting device is fixed to the body 1 of the valve, these two bodies may be placed at a distance from each other, the orifice 18 being connected to the cylinder 9 by way of a suitable pipe.

In any case, the valve is opened and closed in a definite and instantaneous manner, since the directional valve instantaneously and simultaneously ensures the closure of the supply and the opening of the drain or vice versa.

Having now described my invention what I claim as new and desire to secure by Letters Patent is:

1. A device for piloting a safety valve, which valve comprises a closure member, a piston rigid with the closure member and movable in a cylinder which is for communicating selectively with a vessel to be protected and with a drain orifice, said piloting device comprising first conduit means for putting the cylinder in communication with the vessel, second conduit means for putting the cylinder in communication with a drain orifice, a directional valve having a slide which carries at one end of the slide a first valve for selectively opening and closing said first conduit means and at an end opposed to said one end of the slide a second valve for selectively opening and closing said second conduit means, the slide further carrying in a median part of the slide a piston, means putting one face of the piston in communication with the pressure prevailing in the cylinder and means defining with a second face opposed to said one face of the piston an intermediate cavity of the directional valve; and a pilot which comprises third conduit means for putting the vessel in communication with the intermediate cavity and a third valve for selectively opening and closing said third conduit means, and an adjustable and calibrated system which is adapted to oppose the pressure in the vessel for normally opening said third valve, and means for closing said third valve when the third valve is released from said system; and a drain valve for isolating the intermediate cavity of the directional valve from the drain orifice, said drain valve being carried by the calibrated system with a slight axial clearance and being opened by said system after the closure of said third valve.

2. A device according to claim 1, wherein the calibrated system comprises a chamber, means for maintaining the chamber at the pressure of the fluid to be controlled, a movable element movable in said chamber, an adjustable spring means for guidingly resisting movement of said movable element, said movable element being operative to open said third valve in opposition to the action of a return spring.

3. A device according to claim 2, wherein the movable element comprises a hollow piston, and said drain valve includes a rod which is mounted in the hollow piston with a slight axial clearance.

4. A device according to claim 2, wherein the movable element comprises adjacent an end of the movable element opposed to said adjustable spring means a screwthreaded portion on which is screwthreadedly engaged in an adjustable position a member for bearing against a rod of said third valve in opposition to the action of said return spring.

5. A device according to claim 3, wherein the movable element comprises adjacent an end of the movable element opposed to said adjustable spring means a screwthreaded portion on which is screwthreadedly engaged in an adjustable position a member for bearing against a rod of said third valve in opposition to the action of said return spring.

6. A device according to claim 2, wherein said movable element comprises a screwthreaded portion on which is screwthreadedly engaged in an adjustable position an element for adjusting the axial clearance between the drain valve and said movable element.

7. A device according to any one of the claims 2 to 5, wherein said adjustable spring means is located outside said chamber and a sealing device is interposed between said movable element and a wall of said chamber.

8. A device according to any one of the claims 1 to 5, wherein the conduit means which connect said intermediate cavity to said third valve and said drain valve have a very small cross-sectional size.

9. A device according to claim 4 or 5, wherein said element screwthreadedly engaged in an adjustable position on said movable element comprises a helical wheel whose position is adjusted by a micrometer screw which may be adjusted from the exterior of the device.

10. A device according to claim 6, wherein said element screwthreadedly engaged in an adjustable position on said movable element comprises a helical wheel whose position is adjusted by a micrometer screw which may be adjusted from the exterior of the device.

* * * * *